United States Patent [19]  [11] 4,368,828
Samuel et al.  [45] Jan. 18, 1983

[54] SEALING COMPOSITIONS

[75] Inventors: David N. Samuel; Kenneth M. Sinnott, both of Cambridgeshire, England

[73] Assignee: W. R. Grace & Co., Cambridge, Mass.

[21] Appl. No.: 277,551

[22] Filed: Jun. 26, 1981

[30] Foreign Application Priority Data

Sep. 25, 1980 [GB] United Kingdom ............... 8030987

[51] Int. Cl.$^3$ .............................................. B65D 21/02
[52] U.S. Cl. .................................. 220/81 R; 215/341; 215/349; 215/352; 524/494; 524/576; 523/100; 523/219
[58] Field of Search ............... 260/29.75, 42.37, 42.47, 260/40 R; 215/341, 349, 352; 220/81 R

[56] References Cited

U.S. PATENT DOCUMENTS

| 2,806,509 | 9/1957 | Bozzacco et al. ............... 154/28 |
| 3,036,928 | 5/1962 | Poole ............... 117/33 |
| 3,344,099 | 9/1967 | Cahill et al. ............... 260/23.7 |
| 3,381,837 | 5/1968 | Testa et al. ............... 215/40 |
| 3,409,567 | 11/1968 | Dinsdale et al. ............... 260/5 |
| 3,524,794 | 8/1970 | Jonnes et al. ............... 161/160 |
| 3,708,331 | 1/1973 | Leydon et al. ............... 117/95 |
| 3,751,525 | 8/1973 | Brenner et al. ............... 260/880 B |
| 3,767,607 | 10/1973 | Schneider ............... 260/27 BB |
| 3,830,776 | 8/1974 | Carlson et al. ............... 260/37 EP |
| 3,933,724 | 1/1976 | Mixell ............... 260/33.6 A |
| 4,042,732 | 8/1977 | Ferrar ............... 427/385 R |
| 4,053,443 | 10/1977 | Reick ............... 260/29 |
| 4,128,185 | 12/1978 | Wszolek ............... 215/349 |
| 4,138,384 | 2/1979 | Neumann ............... 260/29.75 |
| 4,201,308 | 5/1980 | Neumann ............... 220/81 R |

FOREIGN PATENT DOCUMENTS

| 2345031 | 9/1973 | Fed. Rep. of Germany . |
| 2621115 | 5/1976 | Fed. Rep. of Germany . |
| 2229751 | 3/1974 | France . |
| 2343795 | 3/1976 | France . |
| 53-10660 | 1/1978 | Japan . |
| 1340730 | 12/1973 | United Kingdom . |
| 1566924 | 5/1980 | United Kingdom . |

OTHER PUBLICATIONS

Handbook of Fillers and Reinforcement for Plastics, 1978, (Katz & Milewski), pp. 311 and 312.
"Rubber Technology", M. Morton, ed., Van Nostrand, Reinhold Co., NY, 1973, p. 77.
M. Reckinger, "Une Nouvelle Contribution du Verre au Renforcement des Matieres Plastiques", 1971, 9, No. p. 10–19.

Primary Examiner—Joseph L. Schofer
Assistant Examiner—Bernard Lipman
Attorney, Agent, or Firm—Edward J. Hanson, Jr.; William L. Baker

[57] ABSTRACT

Glass beads having a particle size of 1 to 200 microns are included as part or all of the filler in a sealing composition suitable for sealing container ends and which is made by dispersing a filler in a latex of a styrene butadiene or other rubbery polymer, optionally also containing a tackifying resin.

1 Claim, No Drawings

SEALING COMPOSITIONS

This invention relates to sealing compositions suitable for sealing container closures such as top or bottom end closures of cans or replaceable or non-replaceable caps for jars or bottles. The compositions can be used for other sealing purposes but, for clarity, since they are formulated to meet the particular requirements of can and other container closure seals the invention is described solely in terms of compositions for sealing container closures.

Traditional sealing compositions have comprised a liquid medium in which has been dispersed or dissolved solid polymeric material into which has previously been milled fillers and other additives. The solid polymer into which the additives were milled may previously have been formed by coagulation of, for instance, rubber latex.

In recent years there has been increased interest in sealing compositions based on a latex of a rubbery polymer and into which has been dispersed filler and other additives. Thus in this composition the polymer is obtained initially as a latex, for instance by emulsion polymerisation, and is used directly in this form, without first being coagulated or otherwise solidified. These latex-based compositions are particularly convenient to manufacture, since the additives can be incorporated in them merely by stirring them into the latex, but they do require the use of carefully selected materials in order to obtain optimum properties. Such compositions have been widely sold commercially. Also typical compositions of this type are described in British Patent Specification No. 1,566,924.

The liquid composition is applied to one at least of the mating surfaces of the closure and the sealing face of the container, generally to the closure, and is then dried on the surface. The closure is pressed onto the sealing face of the container so as to grip the container firmly and the composition provides a seal between the container and the closure. It is necessary that the composition should have appropriate rheological and other physical properties. For instance when applied to can ends it should flow adequately during sealing so as to distribute itself over the mating surfaces, but preferably it does not flow to such an extent that significant extrusion of the composition occurs along the walls of the can.

The seal provided by the composition should prevent ingress of bacteria. Generally it should also prevent loss of liquid, vacuum or gas.

It is difficult to formulate latex compositions that will reliably meet these requirements using readily available and economically attractive materials. Typical compositions comprise polymer latex, filler, tackifying resin and various other additives that are present to improve the stability of the latex or to improve the seal or both.

Typical fillers that are used include kaolin, talc, zinc oxide and calcium carbonate. Generally the amount of filler must not be too high or else the sealing properties are impaired.

A wide variety of other fillers have been proposed in the literature. Such fillers are listed in, for instance, British Patent Specification No. 1,566,924. Glass powder is mentioned in the long list of fillers in that specification. However glass powder is obtained by crushing glass and so would inevitably cause very heavy wear of the nozzles by which the liquid composition is deposited onto the closure and so has not been adopted commercially.

In U.S. Pat. No. 3,409,567 a rather different type of can sealing composition is described, namely a composition obtained by dispersing into water milled solid rubber, filler and various other additives. It is mentioned that micro-balloons can be included for the purpose of making a porous layer.

It has been our object to modify the content of latex-based compositions for sealing container closures in such a way that either the seal is improved or the amounts of either the rubber or other elastomeric material or the tackifying resin, or both, can be reduced without reducing the sealing properties. It has also been our object to provide methods of sealing containers using such compositions, and to provide sealed containers.

A sealing composition according to the invention and that is suitable for sealing container ends comprises a latex of a rubbery polymer and into which has been dispersed filler including glass beads having a particle size of 1 to 200 microns.

Such a composition can be used for sealing the sealing face of a container closure to the sealing face of a container in conventional manner. Thus the sealing face of the closure is lined with the composition, the composition is dried to form a gasket, and the sealing face of the closure is compressed around the end of the container thereby sealing the closure to the sealing face with the gasket within the seal. The product is a container having a closure sealed to it by a seal that includes a gasket within the seal formed of the dried composition.

This sealed container may be fully sealed, for instance being a jar or a one piece can or a can sealed at both ends, or it may be a can that has a closure sealed to it at one end but which is open at the other.

When the container is a bottle this gasket is trapped between the sealing face of the rim of the bottle and the overlying closure. Preferably however the container is a can in which event the gasket is trapped in the double seam formed in conventional manner by compressing the outer periphery of the container closure around an outwardly extending flange of the side wall and then pressing the flange and the closure periphery against the side wall of the container, generally in a single operation.

We have found that the inclusion of glass beads does, as a generality, result in improved sealing properties compared to the same composition in which an equivalent volume of other filler (such as kaolin) is used in place of the glass beads. A number of sealing tests are used in the industry and are recognised as being meaningful and by saying that the sealing properties are improved we mean that the number of cans that fail a meaningful sealing test will be reduced.

The beads must be crush resistant, that is to say they must have sufficient strength to resist any risk of crushing during the sealing use to which the composition is to be subjected. Thus in a can end sealing composition the beads must have sufficient strength that they will not crush in the can end seal. The beads can be hollow, provided the walls are sufficiently strong to resist crushing but generally are solid. The beads may be ovoid in shape but preferably are substantially spherical. The particle size of the beads is generally between 1 and 100 microns, most preferably 10 to 75 microns. The average particle size is generally from 5 to 100 microns, most preferably 10 to 50 microns, with best results generally being achieved with an average size of 20 to 50 microns.

The glass beads are preferably formed of soda glass, most preferably of "A" type glass. The beads have preferably been made by solidification of molten glass droplets and may have been treated by a fire polishing process, in conventional manner. Their surface may be untreated or they may have been given a surface coating of a variety of materials provided the surface coating does not interact with other components in the composition in such a way as to reduce significantly the sealing properties of the composition. For instance although many silane surface coatings can be tolerated in many compositions, it may be undesirable to incorporate a mercapto silane if the polymer of the composition is capable of being vulcanised by sulphur, as the mercapto silane may then react so strongly with the polymer as to interfere with the desired sealing properties.

Throughout this specification amounts of components of the composition, including amounts of glass beads and other fillers, are expressed as amounts by volume based on the volume of rubbery polymer, unless otherwise specified. For example 10% glass beads means that there are 10 volumes glass beads per 100 volumes of solid rubbery polymer.

The amount of glass beads in the composition should be at least 1%, since lower amounts tend to give inadequate improvement. Generally the amount is below 100%, and normally below 50%, since greater amounts tend not to give significant further improvement. Generally the amount is at least 3% and preferably at least 5%. Generally the amount is up to 30%. Typically the amount may be from 5 to 50%, most preferably 5 to 30%.

The filler may consist substantially only of glass beads, with the result that the composition may contain no significant amounts of other fillers although it may include fillers that are present primarily for their pigmentary purposes, for instance titanium dioxide which may be present in amounts of up to 10%.

Good results are also obtained when the filler does include particulate inorganic material other than glass beads, and this is generally preferred. The material other than glass may be present in an amount of 0 to 150% (based on the volume of rubbery polymer, generally 10 to 120% and preferably 50 to 100%. Preferably the composition includes 0.05 to 2 parts, most preferably 0.1 to 1 part, by volume glass beads per part by volume other inorganic particulate filler.

Although the total volume of filler, including glass beads, can be similar to that conventionally used in commercial latex sealing compositions, for instance 25 to 45%, a particular advantage of the invention is that larger amounts of total filler may be used while still obtaining satisfactory sealing properties. For instance the total amount of filler, including glass beads, is generally at least 20% (by volume based on the volume of rubbery polymer) and can be up to 175%, for instance 50 to 125%.

Titanium dioxide or other pigmentary filler (for instance carbon black) generally has a particle size below 5 microns but other particulate inorganic fillers that may be used in the invention generally have a particle size of from 1 to 50 microns. The filler should be substantially non-abrasive, so that it does not cause wear to the machinery by which the composition is mixed and lined onto the can or other end, and so materials such as crushed glass should not be used.

The preferred filler is kaolin or china clay but other fillers include colloidal silica and other silicic fillers, synthetic silicate, calcium carbonate or sulphate, aluminium hydroxide, talc, dolomite, or barium sulphate, zinc oxide, or magnesium oxide or carbonate or silicate. Such fillers may have been surface treated, for instance in conventional manner.

Instead of modifying the colour of the composition by including particulate pigment some other colouring material, for instance a soluble dye, may be included.

The latex is based on a rubbery polymer, that is to say a polymer that, when dried, forms a gasket that is sufficiently flexible and resistant to be capable of serving as a seal. Preferably the Mooney viscosity ($ML_{1+4}^{100°C.}$) is generally from 20 to 200, preferably 40 to 160. The latex may be naturally occurring or may be a latex made by emulsion polymerisation and thus the rubbery polymer may be a natural polymer, for instance natural rubber, or may be a synthetic polymer. The latex, irrespective of whether it is made by emulsion polymerisation or is obtained naturally, may be diluted or concentrated before dispersing into it the filler and any other desired additives. Suitable synthetic rubbery polymers include butyl rubber, polychloroprene, polyisoprene, butadiene-acrylonitrile copolymer, acrylonitrile-butadiene-styrene terpolymer, polybutadiene, polyvinylidene chloride homopolymer, polyvinylidene chloride copolymers, plasticised polyvinyl chloride, plasticised polyvinyl acetate, polyvinyl acetate copolymers, polyvinylchloride copolymers, plasticised polyvinyl propionate, polyvinyl propionate copolymers, polyacrylic acid copolymers, polymethacrylic acid copolymers, acrylic ester copolymers, methacrylic ester copolymers, plasticised polystyrene, styrene-butadiene rubbers and carboxylated styrene-butadiene copolymers. Blends may be used. Compositions based on vulcanisable polymers may include vulcanising agent. The preferred polymers are styrene butadiene rubbers having a styrene content of 15 to 60%, preferably 18 to 45%, by weight. They may have been made by any convenient polymerisation method, and thus may have been made by hot or cold polymerisation techniques.

Tackifier resins are generally included in latex can sealing compositions and they may be included in the compositions of the invention. However because of the improved sealing properties obtained by the use of glass beads satisfactory results can often be obtained without a tackifier resin in the invention. Instead of using a tackifier resin a liquid plasticiser, such as white oil or other suitable hydrocarbon oil, that softens the polymer, may be used in amounts of for instance 1 to 60%, preferably 5 to 40%.

Best results are generally obtained when tackifier resin is included. Suitable materials are well known and are generally selected from synthetic hydrocarbon or petroleum resins, polyterpene resins, phenolic resin modified with natural resins such as resin or terpene, xylene formaldehyde resin and modified products thereof, and esterified rosins or other rosin type resins such as rosin, hydrogenated rosin, or hardened rosin. The amount of tackifier is generally at least 10% (by volume of rubbery polymer) but less than 250% and preferably less than 220%. Generally the amount is 15% to 200%.

The composition will contain at least one stabiliser for stabilising the latex and the dispersion. This stabiliser may be selected from any of the materials conventionally used for stabilising sealing compositions based on filled polymer latices. Such stabilisers include styrene maleic anhydride or other styrene copolymers, methyl cellulose, polyacrylamide, ethoxylate condensates, polyvinyl pyrolidone, ammonium oleate, and casein. Such stabilisers may be used in admixture, for instance with other materials.

The compositions may include minor amounts, e.g. up to 1% or at most up to 5% of other additives that are known to those skilled in the art and that are conventional in filled latex sealing compositions, such as viscosity increasing agents (for instance ammonium alginate, bentonite or gum karaya or high molecular weight polyacrylic acid), bactericides, corrosion inhibitors, surfactants, anti-oxidants (for instance phenolic or amino anti-oxidants) and pH adjusters (for instance ammonia, primary amine, sodium hydroxide or sodium carbonate).

The total solids content of the composition is generally from 20 to 85% by weight, preferably 30 to 80%.

The composition may be made simply by mixing into the chosen latex (optionally after dilution) the tackifying resin, glass beads and any other filler, and any other additives all in conventional manner. Naturally care must be taken to ensure that the latex does not coagulate and that a uniform dispersion is obtained. For instance it may be desirable to form a dispersion of the filler, including glass, and optionally also tackifier and add this stable dispersion to the latex.

Some non-limiting examples of the invention are now given.

In these sealing properties are identified by two sets of quantitative values which are referred to as "biological seal" and "sterilisation extrusion". These are recorded as follows:

"Biological seal". The composition is lined into can closures (often termed can ends) and dried in conventional manner, the amount of the composition being such as to give the dry film volume generally recommended for the particular size. Cans having a soldered side seam are then filled with a hot liquid nutrient, typically at a temperature of 97° C., leaving a small headspace. The test closures are double seamed onto these filled cans whilst simultaneously injecting steam into the headspace. The closed cans are then sterilised, typically at 121° C. for 30 minutes, and after sterilisation are immediately cooled in water containing gas-producing, non-pathogenic micro-organisms capable of growth in the aforementioned nutrient. After cooling and whilst still wet with the cooling water, the cans are subjected to a controlled deformation at the junction of the side seam and the double seam of the test closure. After incubation for six days at an elevated temperature optimum for the growth of the micro-organism, followed by one day at ambient temperature, the cans are examined visually and the number of swollen cans recorded. The retained vacuum in the remaining cans is measured. Cans having a low retained vacuum and the swollen cans are considered to have reached this condition through failure of the seal in the test closure. The swollen and low vacuum cans are termed failures and the "biological seal" value is the failure rate expressed as the number of such cans per thousand tested. Because of the procedures used the number of failed cans per thousand in this biological seal test is of course very much greater than that which would occur with commercially packed cans sealed with these compositions.

"Sterilisation extrusion". The composition is lined into can closures and dried, in conventional manner, the amount of the composition being such as to give a dry film volume approximately 20% greater than that generally recommended with the particular closure size. Cans are filled with water at typically 70° C. to leave no headspace and test closures are double seamed onto these filled cans. The closed cans are then sterilised typically at 130° C. for one hour and allowed to cool to room temperature before examination. The number of protrusions of compound from the double seam along the outside wall of the can body at the test closure are counted, typically on a sample of 10 cans for each composition. Large protrusions are counted as appropriate multiples of the typical, more commonly occurring, small protrusions. The average number of protrusions per can is recorded as the value for "extrusion". This value should be as low as possible, preferably below 10 under the conditions of the test. However, because of the extreme conditions of the test, greater values than this are commercially tolerable.

In the following examples each composition is made by mixing together the latex of the chosen rubbery polymer and containing minor amounts of conventional additives known to those skilled in the art, stabiliser, filler, titanium dioxide pigment, and tackifier resin (when present). Unless otherwise specified there is 22% of a main tackifier, the amount of stabiliser is 4.2%, the amount of titanium dioxide is 3.2%, and the amount of filler is 30%, all based on the volume of rubbery polymer in the latex. When the filler is kaolin the total solids content of the composition is about 60% by weight.

In each of the examples the filler consists of the glass beads (if present) and the stated inorganic particulate material (if present) which generally has a particle size of 1 to 50 microns although titanium dioxide may have a particle size of down to 0.1 microns. Unless otherwise stated the glass beads are formed from molten soda glass and unless otherwise stated the beads have particle sizes between 1 and 53 microns, with an average partical size of about 35 microns.

In Examples 1, 2, 3 and 4 the composition includes 22% of hydrocarbon resin tackifier. In Examples 5 and 6 the amount of tackifier (if present) or substitute material is as stated.

In Examples 1 to 6 and in Examples 7a and 7b the stabiliser is styrene maleic anhydride copolymer stabiliser but in the other compositions in Example 7 different stabilisers are used.

In each of Examples 1 to 7 the latex is a styrene butadiene latex having a solids content of 66 to 69% by weight and containing 31 to 36% bound styrene and which has been polymerised cold (at 5° C.) using fatty acid soaps. The polymer in the latex has a Mooney value (as defined above) of 100 to 130. However, similar results may be obtained using other styrene butadiene latices that may have been polymerised hot or cold such as those listed in the following table:

| Type | Total Solids % | Bound Styrene % | Mooney Value | Emulsifier |
|---|---|---|---|---|
| Cold | 63 | 29 | 140 | Fatty acid |
| Cold | 67 | 34 | 75 | Fatty acid |
| Cold | 68 | 30 | 150 | Fatty acid |
| Hot | 45 | 46 | 90 | Rosin ester |
| Hot | 42 | 50 | 30 | Rosin ester |
| Hot | 59 | 46 | 75 | Rosin ester |
| Hot | 50 | 46 | 70 | Rosin ester |

The hydrocarbon resin tackifier is a polymer of mixed 5-carbon alkenes having a melting point of about 100° C. In Example 8 the styrene-acrylic ester copolymer has a minimum film forming temperature of 20° C. and a film hardness (Persoz) of 160 seconds. Similar results are obtainable with other styrene-acrylic ester latices. In Example 8 the polyvinylidene chloride copolymer latex is one having a minimum film formation temperature of 4° C.

In Example 9, the latex is a styrene butadiene latex having a solids content of 49–51% and containing 44% bound styrene which was polymerised at 55° C. using rosin acid soaps, the polymer in the latex having a Mooney value as previously defined of 60–80. This formulation is stabilised with 9 volumes of casein and vulcanised with a 1/1/0.5 volume system of zinc oxide, zinc dibutyl dithiocarbamate/sulphur. It is pigmented with 4 volumes each of titanium oxide and iron oxide.

In example 10, the rubbery polymer is derived from a blend of two latices, one being a latex of a polymer of 2 chloro-butadiene having a solids content of 58%, the Defo plasticity of the polymer being 7,000±1,000 and the Shore A hardness about 40, and the other the latex of a copolymer of vinyl acetate maleic acid ester having a solids content of 54% and having a minimum film forming temperature of 12° C., in a dry volume ratio of 83.5/16.5 respectively. The formulation is stabilised with 6.5 volumes of casein and plasticised with 5 volumes butyl benzyl phthalate and 1.5 volumes of di-isooctyl phthalate. The 'biological seal' results of this example are obtained in a modified method wherein vegetable oil is added to the nutrient broth and no steam is injected during double seaming.

In example 11 the rubbery polymer is derived from a blend of two latices one being a pre-vulcanised natural rubber latex having a total solids content of 62% and the other a polychloroprene latex having a total solids of 59%, in a dry volume ratio of 92.5/7.5 respectively. The formulation is stabilised by the addition of 4.5 volumes of ammonium oleate.

In example 12, the rubbery polymer is derived from a natural rubber latex having a solids content of 61%. This formulation is stabilised with 3.5 volumes of styrene maleic anhydride copolymer and contains 50 volumes of hydro-carbon resin.

In tests 13A to 13F of example 13, the rubbery polymer is a cold polymerised styrene butadiene latex having a total solids of 67%, a bound styrene content of 32% and a Mooney viscosity of 115. In test 13G the rubbery polymer is a blend of 20 parts (dry volume) of this latex with 80 parts (dry volume) of a hot polymerised styrene butadiene latex having a total solids of 59%, a bound styrene content of 46% and a Mooney viscosity of 75. Both latices are stabilised by styrene maleic anhydride copolymer.

Since the extrusion and biological seal results will vary according to, for instance, variable conditions under which the tests are carried out comparisons should, in general, be made only between results within a single example. It is desirable that the "biological seal" and "sterilisation extrusion" values should be as low as possible. The following examples show that the inclusion of glass beads reduces the values, thus demonstrating improved sealing, in comparative compositions and that good sealing performance can be obtained even when, for instance, the composition contains widely ranging proportions of ingredients and widely differing ingredients. All quantities are expressed as parts by volume unless otherwise stated except that the content of styrene in styrene butadiene rubbers and the solids content of latices are expressed as percentages by weight.

Examples 1 to 4

| Test | Filler | | Biological Seal | Sterilisation Extrusion |
|---|---|---|---|---|
| 1A | 30 Kaolin | 0 Glass beads | 680 | 10.3 |
| 1B | 22.5 Kaolin | 7.5 Glass beads | 290 | 1.4 |
| 1C | 15 Kaolin | 15 Glass beads | 75 | 0.3 |
| 1D | 7.5 Kaolin | 22.5 Glass beads | 60 | 0.5 |
| 1E | 0 Kaolin | 30 Glass beads | 105 | 0.2 |
| 1F | 28 Kaolin | 28 Glass beads | 110 | 0.5 |
| 1G | 0 Kaolin | 59 Glass beads | 155 | 0.4 |
| 1H | 0 Kaolin | 89 Glass beads | 165 | 0.0 |
| 1I | 0 Kaolin | 30 Crushed glass | 420 | 19.8 |
| 1J | 0 Kaolin | 30 Glass Microballons | 585 | 7.4 |
| 2A | 30 Kaolin | 0 Glass beads | 225 | 38.6 |
| 2B | 0 Kaolin | 30 Glass beads 1–53µ | 10 | 2.7 |
| 2C | 0 Kaolin | 30 Glass beads 45–74µ | 5 | 24.2 |
| 2D | 0 Kaolin | 30 Glass beads 74–149µ | 10 | 23 |
| 2E | 0 Kaolin | 30 Glass beads 3–10µ | 90 | 27.9 |
| 2F | 0 Kaolin | 30 Glass beads 1–5µ | 100 | 33.2 |
| 2G | 0 Kaolin | 30 Low Soda, Type E Glass beads 0–44µ | 10 | 0.1 |
| 3A | 30 Kaolin | 0 Glass beads | 410 | 25.9 |
| 3B | 15 Kaolin | 15 Glass beads | 15 | 3.8 |
| 3C | 30 Talc | 0 Glass beads | 245 | 30.3 |
| 3D | 15 Talc | 15 Glass beads | 25 | 1.5 |
| 3E | 30 Barium Sulphate | 0 Glass beads | 210 | 2.0 |
| 3F | 15 Barium Sulphate | 15 Glass beads | 20 | 1.8 |
| 3G | 30 Titanium dioxide | 0 Glass beads | 490 | 10.4 |
| 3H | 15 Titanium dioxide | 15 Glass beads | 40 | 5 |
| 3I | 30 Calcium Carbonate | 0 Glass beads | 150 | 4.0 |
| 3J | 15 Calcium Carbonate | 15 Glass beads | 10 | 2.1 |
| 3K | 30 Aluminum Hydroxide | 0 Glass beads | 245 | 15 |
| 3L | 15 Aluminum Hydroxide | 15 Glass beads | 10 | 0.7 |
| 3M | 30 Spherical Silica | 0 Glass beads | 430 | 18.8 |
| 3N | 15 Spherical Silica | 15 Glass beads | 40 | 4.0 |
| 4A | 30 Kaolin | 0 Glass beads | 190 | 36.9 |
| 4B | 0 Kaolin | 30 Glass beads | 5 | 0.9 |

-continued

| | | | | | |
|---|---|---|---|---|---|
| 4C | 0 Kaolin | | 30 Crushed glass | 60 | 17.0 |

Examples 5 and 6

| Test | Filler | | Tackifier | Biological Seal | Sterilisation Extrusion |
|---|---|---|---|---|---|
| 5A | 30 Kaolin | 0 Glass beads | 22 Hydrocarbon resin | 585 | 0.4 |
| 5B | 68 Kaolin | 18 Glass beads | 27 Hydrocarbon resin | 410 | 0.1 |
| 5C | 43 Kaolin | 43 Glass beads | 27 Hydrocarbon resin | 170 | 0.0 |
| 5D | 68 Kaolin | 18 Glass beads | 47 Hydrocarbon resin | 325 | 0.0 |
| 5E | 43 Kaolin | 43 Glass beads | 47 Hydrocarbon resin | 145 | 0.0 |
| 5F | 43 Kaolin | 43 Glass beads | 12.5 White Oil | 260 | 0.0 |
| 5G | 43 Kaolin | 43 Glass beads | 37.5 White Oil | 285 | 0.0 |
| 5H | 30 Kaolin | 0 Glass beads | 22 Hydrocarbon resin | 235 | 50.4 |
| 5I | 56.5 Kaolin | 0 Glass beads | 180 Hydrocarbon resin | 635 | 18.4 |
| 5J | 56.5 Kaolin | 24 Glass beads | 180 Hydrocarbon resin | 310 | 3.4 |
| 5K | 30 Kaolin | 0 Glass beads | 22 Hydrocarbon resin | 325 | |
| 5L | 104 Kaolin | 10 Glass beads | 80 Hydrocarbon resin | 155 | |
| 5M | 94 | 20 Glass beads | 80 Hydrocarbon resin | 130 | |
| 6A | 30 Kaolin | 0 Glass beads | No tackifier | 495 | 28.7 |
| 6B | 0 Kaolin | 30 Glass beads | No tackifier | 75 | 2.7 |
| 6C | 30 Kaolin | 0 Glass beads | 22 Methyl ester of | 180 | 50.6 |
| 6D | 0 Kaolin | 30 Glass beads | hydrogenated rosin | 35 | 16.7 |
| 6E | 30 Kaolin | 0 Glass beads | 22 methylated melamine formal- | 545 | 65.6 |
| 6F | 0 Kaolin | 30 Glass beads | dehyde resin | 80 | 46.8 |
| 6G | 30 Kaolin | 0 Glass beads | 22 pentaerythritol ester of | 710 | 41.2 |
| 6H | 0 Kaolin | 30 Glass beads | an alkyd resin | 195 | 12.5 |
| 6I | 30 Kaolin | 0 Glass beads | 22 Coumarone | 420 | 39.4 |
| 6J | 0 Kaolin | 30 Glass beads | Indene rosin | 60 | 21.5 |

Example 7

| Test | Filler | | Stabiliser | Biological Seal | Sterilisation Extrusion |
|---|---|---|---|---|---|
| 7A | 30 Kaolin | 0 Glass Beads | styrene maleic anhydride | 315 | 38.1 |
| 7B | 0 Kaolin | 30 Glass Beads | copolymer | 15 | 15.5 |
| 7C | 30 Kaolin | 0 Glass Beads | casein with sulphonate and ethoxylate | 420 | 67 |
| 7D | 0 Kaolin | 30 Glass Beads | stabilisers | 95 | 35.7 |
| 7E | 30 Kaolin | 0 Glass Beads | polyacrylamide | 260 | 61.6 |
| 7F | 0 Kaolin | 30 Glass Beads | | 50 | 27.1 |
| 7G | 30 Kaolin | 0 Glass Beads | ethoxylate condensate | 495 | 77.4 |
| 7H | 0 Kaolin | 30 Glass Beads | | 135 | 37.8 |
| 7I | 30 Kaolin | 0 Glass Beads | polyvinyl pyrrolidone | 370 | 59.1 |
| 7J | 0 Kaolin | 30 Glass Beads | | 35 | 18.5 |
| 7K | 30 Kaolin | 0 Glass Beads | ammonium oleate | 805 | 65.5 |
| 7L | 0 Kaolin | 30 Glass Beads | | 465 | 34.6 |

Example 8

| Test | Filler | | Rubbery copolymer | Biological Seal | Sterilisation Extrusion |
|---|---|---|---|---|---|
| 8A | 30 Kaolin | 0 Glass beads | styrene acrylic copolymer | 375 | 20.4 |
| 8B | 0 Kaolin | 30 Glass beads | | 25 | 1.8 |
| 8C | 30 Kaolin | 0 Glass beads | polyvinylidene chloride | 590 | 6.4 |
| 8D | 0 Kaolin | 30 Glass beads | | 65 | 12.9 |

Example 9
(vulcanised styrene-butadiene polymer)

| Test | Filler | | Biological Seal | Sterilisation Extrusion |
|---|---|---|---|---|
| 9A | 23 Kaolin | 0 Glass beads | 55 | 3.7 |
| 9B | 0 Kaolin | 23 Glass beads | 5 | 2.4 |

Example 10
(2-chlorobutadiene polymer and vinylacetate-maleic acid ester copolymer)

| Test | Filler | | | Biological Seal |
|---|---|---|---|---|
| 10A | 8 Titanium Dioxide | 27.5 Kaolin | 0 Glass beads | 185 |
| 10B | 8 Titanium Dioxide | 0 Kaolin | 27.5 Glass beads | 25 |

-continued

Example 11
(natural rubber and polychloroprene)

| Test | Filler | | Biological Seal | Sterilisation Extrusion |
|---|---|---|---|---|
| 11A | 71 Kaolin | 0 Glass beads | 125 | 9.0 |
| 11B | 35.5 Kaolin | 35.5 Glass beads | 5 | 0 |
| 11C | 0 Kaolin | 71 Glass beads | 10 | 0 |

Example 12
(natural rubber)

| Test | Filler | | Biological Seal | Sterilisation Extrusion |
|---|---|---|---|---|
| 12A | 68 Kaolin | 0 Glass beads | 135 | 0 |
| 12B | 68 Kaolin | 24 Glass beads | 55 | 0 |

Example 13

| Test | Filler | | Tackifier | Biological Seal | Sterilisation Extrusion |
|---|---|---|---|---|---|
| 13A | 47 Kaolin | 24 Glass beads | 102 Hydrocarbon resin | 150 | 3.4 |
| 13B | 70 Kaolin | 24 Glass beads | 51 Hydrocarbon resin | 160 | 0.4 |
| 13C | 70 Kaolin | 24 Glass beads | 153 Hydrocarbon resin | 250 | 23.0 |
| 13D | 93 Kaolin | 24 Glass beads | 153 Hydrocarbon resin | 215 | 8.8 |
| 13E | 70 Kaolin | 24 Glass beads | 204 Hydrocarbon resin | 185 | 33.9 |
| 13F | 93 Kaolin | 24 Glass beads | 204 Hydrocarbon resin | 225 | 17.3 |
| 13G | 30 Kaolin | 0 Glass beads | 22 Hydrocarbon resin | 205 | 30.6 |

We claim:

1. A container having a closure sealed to it by a seal that includes a gasket that has been formed from a composition comprising a latex of a rubbery polymer and in which has been dispersed a filler including crush resistant glass beads having a particle size of about 1 to about 200 microns.

* * * * *